June 20, 1961 W. BILZ 2,989,697
REPRODUCING DEVICE
Filed Oct. 9, 1956
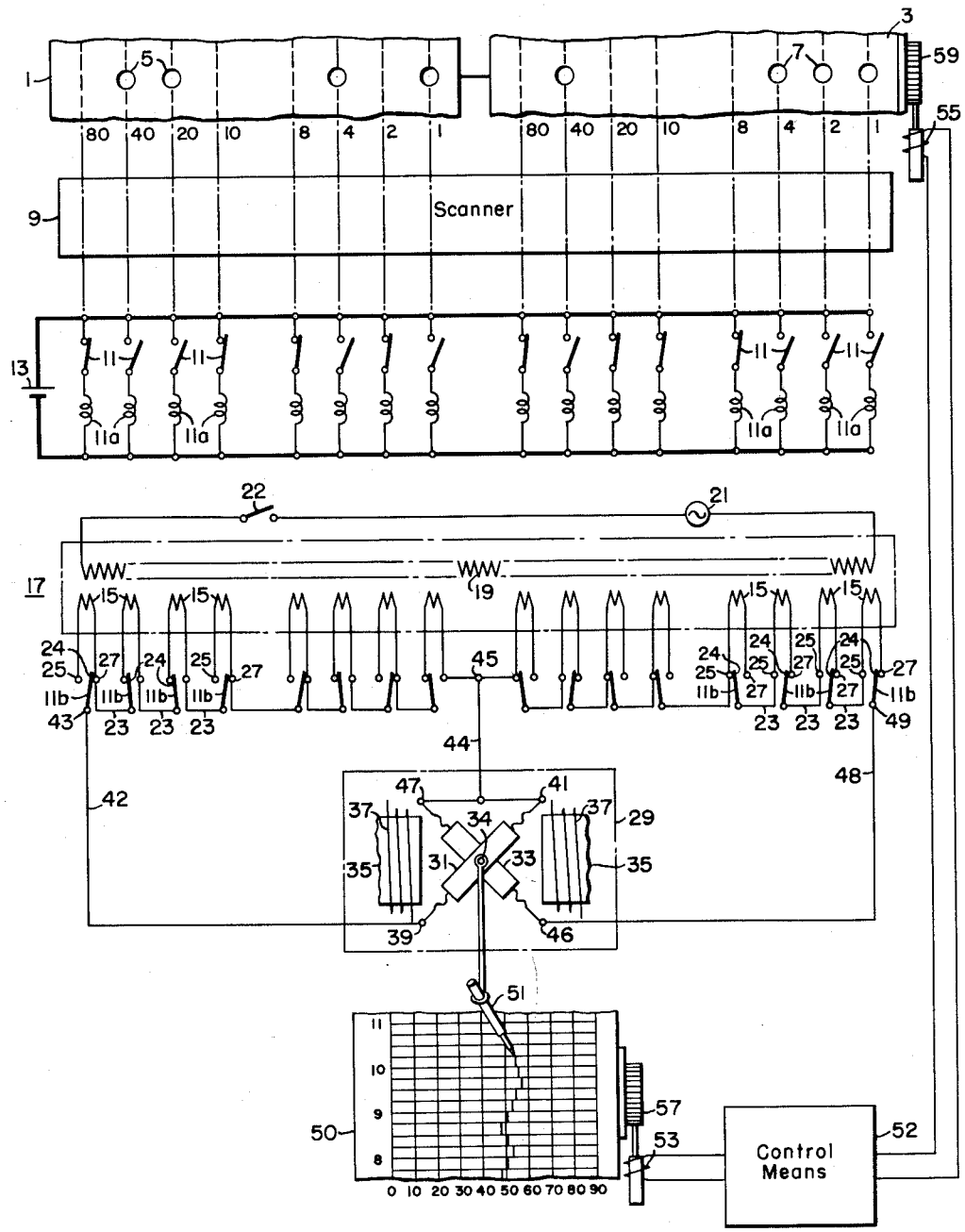
WITNESSES
INVENTOR
Wilhelm Bilz
BY
ATTORNEY

United States Patent Office 2,989,697
Patented June 20, 1961

2,989,697
REPRODUCING DEVICE
Wilhelm Bilz, Schwaig, near Nurnberg, Germany, assignor to Siemens-Schuckertwerke Aktiengesellschaft, Erlangen, Germany, a corporation of Germany
Filed Oct. 9, 1956, Ser. No. 614,923
Claims priority, application Germany Oct. 19, 1955
10 Claims. (Cl. 324—83)

This invention relates to reproducing devices and has particular relation to a device for automatically producing a response which is a function of the values of a plurality of measured quantities.

In certain situations, it may be desirable to provide a response which is a function of the values of a plurality of measured quantities. For example, such a situation may arise in connection with electrical installations. In such installations, it is generally the practice to provide periodic simultaneous measurements of the values of the real and reactive power components of an electrical circuit. These measurements are ordinarily recorded in any suitable manner to provide a permanent record thereof. For certain purposes, it may be desired to provide an indication of the phase angle under which these power values have been measured.

According to the present invention, an improved device is provided for automatically producing from measurements of the values of a plurality of quantities a response which is a function of the measured values. The device is particularly adapted to produce such a response from a plurality of record devices providing records of the measured values. Although the invention has many and varied uses, it will be described in connection with electrical installations for providing an indication of the phase angle under which the real and reactive power components of an electrical circuit have previously been simultaneously measured. The invention is particularly applicable to installations wherein the real and reactive power components of an electrical circuit are simultaneously measured in any suitable manner with each measured value recorded by suitable markings imposed on separate record strips.

In a preferred embodiment of the invention the reproducing device includes a suitable scanning device which is arranged to scan the record strips for detecting the markings imposed thereon. The scanning device is effective to actuate a plurality of control switches in response to detection of the markings. Suitable voltage producing means are provided to produce a pair of resultant voltages each representing a separate one of the recorded power components. These voltage producing means are controlled by the control switches so as to provide a pair of resultant voltages, each having a value which is proportional to a separate one of the recorded power values.

A suitable quotient or ratio instrument is connected for energization in accordance with the resultant voltages to produce a response which is a function of the ratio of the resultant voltages and consequently which is a function of the phase angle under which the power values have been measured. The quotient device is preferably in the form of an electrical instrument having a pair of cross coils each energizable in accordance with a separate one of the resultant voltages. The instrument is preferably of the recording type effective to produce a marking upon a suitable record strip.

It is, therefore, an object of the invention to provide an improved device for automatically producing a response which is a function of the values of a plurality of measured quantities.

It is another object of the invention to provide a device for automatically producing from recorded simultaneous measurements of the values of real and reactive power components of an electrical circuit a response which is a function of the phase angle under which the real and reactive power components have previously been measured.

It is still another object of the invention to provide a device as defined in the preceding paragraph which includes a conventional ratio instrument for producing such a response.

Other objects of the invention will become apparent from the following description taken in conjunction with the accompanying drawing in which the single figure is a schematic representation of a reproducing device constructed in accordance with the teachings of the present invention.

Referring to the single drawing, there is illustrated a pair of record strips 1 and 3 for providing a permanent record of the values of a pair of measured quantities. In the present invention, it is assumed that the strips 1 and 3 provide records of the values of simultaneously measured real and reactive power components of an electrical circuit (not shown).

The records may be produced in any suitable manner. Preferably, the records are obtained by suitable punching of the strips 1 and 3 to provide a plurality of spaced perforations 5 and 7 which are arranged in a preselected manner to represent the values of the measured power components. Such punching may be effected in any suitable manner under the control of suitable real and reactive power measuring devices (not shown).

In the drawing, the perforations 5 are illustrated as arranged in spaced relation along a horizontal line to represent different record numbers of the strip 1 which decrease in value when read from left to right as viewed in the drawing. In a similar manner, the perforations 7 are arranged to represent different record numbers of the strip 3 which decrease in value when read from left to right as viewed in the drawing. For example, four perforations 5 are arranged on the strip 1 to represent respectively the record numbers 40, 20, 4 and 1. The total of these represented record numbers then provides a value of 65 units of real power. In a similiar manner, the perforations 7 are arranged on the strip 3 to represent a total value of 47 units of reactive power.

According to the present invention a reproducing device is provided for producing from the measured power values recorded on the strips 1 and 3 a response which is a function of the phase angle under which the values have been measured. The reproducing device includes a suitable scanning device represented diagrammatically by the block 9 for the purpose of scanning the strips 1 and 3 in order to detect the markings imposed thereon. The scanning device 9 may be of any suitable construction which is effective to actuate suitable control switches in response to the detection of markings imposed on the record strips. For example, the scanning device may include photoelectric components which are effective in response to the detection of markings such as the perforations 5 and 7 to cause the flow of electrical currents for operating suitable relays for actuating the control switches.

In the preferred embodiment of the invention illustrated, a separate plurality of control switches 11 is provided for each of the strips 1 and 3 with each switch 11 associated with a separate one of the record numbers for the strips 1 and 3. These switches are arranged for actuation in response to the detection of corresponding perforations by the device 9. For example, when the device 9 detects the perforation 5 of the strip 1 which represents the record number 40, the switch 11 which is associated with this number 40 will be actuated from a normally closed position to an open position as illustrated in the drawing. The remaining ones of the switches 11 are operated in an identical manner.

The control switches 11 are arranged to control the energization of a plurality of relay coils 11a which, in turn, control the actuation of a plurality of additional control switches 11b. For this purpose, each of the switches 11 is illustrated as connected in series relation with a separate one of the coils 11a across a voltage source illustrated in the form of a battery 13.

The switches 11b are arranged to control the connections of a plurality of voltage producing means which are provided to produce a pair of resultant voltages each representing a separate one of the power components. These voltage producing means comprise circuit components which are preferably in the form of sections 15 of a secondary winding of a transformer 17 which has a primary winding 19. The primary winding 19 is shown connected for energization form a source of alternating current voltage 21 through a suitable switch 22. It is observed that a separate plurality of the sections 15 is provided for each of the strips 1 and 3. Suitable circuit means comprising conductors 23 connect the sections 15 of each plurality of the sections in series circuit relation.

It is observed that the sections 15 are arranged such that a separate one of the sections is provided for each of the different record numbers for the record strips 1 and 3. The number of turns of the sections 15 is selected such that the voltages produced by such sections in response to energization of the winding 19 are proportional to the values of the associated record numbers of the record strips. For example, the number of turns of the section 15 which is associated with the record numeral 80 of the strip 1 is selected to be twice the number of turns of the section 15 associated with the record numeral 40 of the strip 1. For purposes of convenience the desired relationship between the number of turns of the sections 15 is not illustrated.

A separate one of the switches 11b is arranged to control the connection of each of the sections 15 to the conductors 23. Each of the switches 11b includes a movable contact 24 which is movable between a pair of spaced terminals 25 and 27 of its associated section 15. When the device 9 scans the strips 1 and 3 those switches 11 associated with record numerals of the strips which are represented by perforations are actuated to a circuit interrupting position whereby the associated relay coils 11a are deenergized. Such deenergization of the relay coils results in movement of the corresponding switches 11b to positions effective to connect the associated sections 15 to the conductors 23 in series circuit relation. The switches 11 associated with record numbers of the record strips which are not represented by perforations remain in circuit-closing positions whereby the corresponding switches 11b are positioned such that the associated sections 15 are disconnected from the series circuit provided by the conductors 23. Consequently, this arrangement provides two resultant voltages having values proportional to the values of the recorded power components.

In order to produce a response which is a function of the values of the recorded power components the reproducing device includes suitable translating means 29 connected for energization in accordance with the two resultant voltages produced by the sections 15. The translating means 29 may take any suitable form. In a preferred embodiment of the invention, the translating means 29 is in the form of a conventional electrical quotient or ratio instrument having a pair of operating elements each connected for energization in accordance with a separate one of the resultant voltages produced by the sections 15. As illustrated in the drawing, the instrument 29 includes a pair of cross coils 31 and 33 which are secured to each other and to a suitable shaft 34. The shaft 34 mounts the coils 31 and 33 for rotation through a magnetic field produced by electromagnetic means illustrated diagrammatically in the form of a magnetic core 35 having suitable alternating current windings 37 wound thereon. The windings 37 may be energized in accordance with any suitable alternating quantity.

It is observed that the coil 31 includes a pair of terminals 39 and 41 with the terminal 39 connected through a conductor 42 to the terminal 43 of the relay switch 11b which is located at the extreme left-hand end as viewed in the drawing, and with the terminal 41 connected through a conductor 44 to a center-tap connection 45 for the secondary winding of the transformer 17. With this arrangement, the coil 31 is connected for energization in accordance with a resultant voltage having a value proportional to the value of the real power recorded on the strip 1. In a similar manner, the coil 33 includes a pair of terminals 46 and 47 with the terminal 46 connected through a conductor 48 to the terminal 49 of the relay switch 11b which is located at the extreme right-hand end as viewed in the drawing. The terminal 47 is connected to the center-tap connection 45. With such an arrangement, the coil 33 is connected for energization in accordance with a resultant voltage quantity having a value which is proportional to the value of reactive power recorded on the strip 3.

With such connections when the coils 31 and 33 and the windings 37 are energized, the coils 31 and 33 will be rotated in accordance with a function of the ratio of the energizing resultant voltages. Since these resultant voltages are proportional to the recorded power values, the response of the instrument 29 will be a function of the ratio of these recorded power values and consequently a function of the phase angle under which the power values have been measured.

The response of the instrument 29 may be indicated in any suitable manner. Preferably, the response of the instrument is recorded on a suitable record strip 50 in any suitable manner such as by inking or punching. As illustrated diagrammatically in the drawing, a suitable writing or inking member 51 is secured to the shaft 34 to impose markings upon the strip 50. If desired, the response of the instrument 29 may be recorded by a recording device (not shown) which is operated by the instrument 29. The strip 50 is shown as being calibrated directly in angular degrees to provide a direct record of the phase angle.

Subsequent to a reproducing operation, it is desirable to effect movement of the recording strips 1, 3 and 50 to prepare such strips for a succeeding measuring and reproducing operation. Any suitable means may be employed for this purpose. As illustrated diagrammatically in the drawing, a suitable control means represented by the block 52 may be operated upon the termination of the phase angle recording operation to simultaneously energize a pair of solenoids 53 and 55 for actuating ratchet wheels 57 and 59 carried respectively by the recording strips 1 and 3 and the strip 50. The ratchet wheels may be proportioned to effect a predetermined movement of the recording strips sufficient to permit the desired succeeding measuring and recording operations.

Although the invention has been described with reference to certain specific embodiments thereof, numerous modifications are possible, and it is desired to cover all modifications falling within the spirit and scope of the invention.

I claim as my invention:

1. In a reproducing system, a pair of record devices each providing a record of the value of a separate recorded quantity, scanning means operable to scan said records simultaneously for detecting said recorded values, voltage producing means connected to provide a pair of resultant voltages each representing a separate one of said recorded quantities, control means actuable to control the connections of said voltage producing means for controlling the values of said resultant voltages, said scanning means operating in response to detection of said recorded values to actuate said control means to provide values of said resultant voltages proportional to said recorded values, and a totalizing translating means having a plurality of input terminals connected for energization by said resultant voltages, said translating means having a single output signal to produce a unitary output response which is a function of the total of said recorded values.

2. In a reproducing system, a pair of record devices each providing a record of the value of a separate recorded quantity, scanning means operable to scan said records simultaneously for detecting said recorded values, voltage producing means connected to provide a pair of resultant voltages each representing a separate one of said recorded quantities, control means actuable to control the connections of said voltage producing means for controlling the values of said resultant voltages, said scanning means operating in response to detection of said recorded values to actuate said control means to provide values of said resultant voltages proportional to said recorded values, and an electrical ratio instrument including a pair of crossed coils, each of said coils being connected for energization in accordance with a separate one of said resultant voltages to produce a response which is a function of the ratio of said recorded values.

3. In a reproducing device responsive to a pair of record devices each providing a record of the value of a separate recorded quantity, scanning means operable to scan said records simultaneously for detecting said recorded values, a source of electrical voltage, a plurality of electrical circuit components arranged for energization from said voltage source to produce a pair of resultant voltages each representing a separate one of said recorded quantities, circuit means connecting said circuit components in series relation, a plurality of actuable switch means arranged to control the connection of said circuit components to said circuit means to thereby control the values of said resultant voltages, said scanning means operating in response to detection of said recorded values to actuate selected ones of said switch means depending upon the values of said recorded quantities to provide values of said resultant voltages proportional to said recorded values, and translating means connected to said circuit means for energization in accordance with said resultant voltages to produce a response which is a function of said recorded values.

4. In a reproducing device responsive to a pair of record devices each providing a record of the value of a separate recorded quantity, scanning means operable to scan said records simultaneously for detecting said recorded values, a source of alternating voltage, a transformer device including a primary winding connected for energization from said voltage source, and a plurality of secondary winding sections arranged to produce a pair of resultant voltages each representing a separate one of said recorded quantities in response to energization of said primary winding; circuit means connecting said winding sections in series relation, a plurality of actuable switch means arranged to control the connection of said winding sections to said circuit means to thereby control the values of said resultant voltages, said scanning means operating in response to detection of said recorded values to actuate selected ones of said switch means depending upon the values of said recorded quantities to provide values of said resultant voltages proportional to said recorded values, and translating means connected to said circuit means for energization in accordance with said resultant voltages to produce a response which is a function of said recorded values.

5. In a reproducing device responsive to a pair of record devices each providing a record of the value of a separate recorded quantity, scanning means operable to scan said records simultaneously for detecting said recorded values, a source of electrical voltage, a plurality of electrical circuit components arranged for energization from said voltage source to produce a pair of resultant voltages each representing a separate one of said recorded quantities, circuit means connecting said circuit components in series relation, a plurality of actuable switch means arranged to control the connection of said circuit components to said circuit means to thereby control the values of said resultant voltages, said scanning means operating in response to detection of said recorded values to actuate selected ones of said switch means depending upon the values of said recorded quantities to provide values of said resultant voltages proportional to said recorded values, and an electrical ratio instrument including a pair of crossed coils, each of said coils being connected to said circuit means for energization in accordance with a separate one of said resultant voltages to produce a response which is a function of the ratio of said recorded values.

6. In a reproducing device responsive to a pair of record devices each providing a record of the value of a separate recorded quantity, scanning means operable to scan said records simultaneously for detecting said recorded values, a source of alternating voltage, a transformer device including a primary winding connected for energization from said voltage source, and a plurality of secondary winding sections arranged to produce a pair of resultant voltages each representing a separate one of said recorded quantities in response to energization of said primary winding; circuit means connecting said winding sections in series relation, a plurality of actuable switch means arranged to control the connection of said winding sections to said circuit means to thereby control the values of said resultant voltages, said scanning means operating in response to detection of said recorded values to actuate selected ones of said switch means depending upon the values of said recorded quantities to provide values of said resultant voltages proportional to said recorded values, and an electrical ratio instrument including a pair of crossed coils, each of said coils being connected to said circuit means for energization in accordance with a separate one of said resultant voltages to produce a response which is a function of the ratio of said recorded values.

7. In a reproducing device responsive to a pair of record devices having respectively first and second markings imposed thereon, said first markings being arranged to represent different first record numbers providing a resultant number corresponding to the value of the real power component measured in an electrical circuit, said second markings being arranged to represent different record numbers providing a resultant number corresponding to the value of the reactive power component measured in said circuit, scanning means operable to scan said record devices simultaneously for detecting said markings, a separate electrical circuit component for each of said different record numbers, a source of electrical voltage, each of said circuit components being arranged for energization from said source of voltage to produce a separate voltage quantity, said separate voltage quantities providing a pair of resultant voltages each representing a separate one of said power components, said circuit components being selected such that said separate voltage quantities have values proportional to said different record numbers, circuit means connecting said circuit components in series relation, a plurality of actuable switches each arranged to control the connection of a separate one of said circuit components to said circuit means to thereby control the values of said resultant voltages, said scanning means operating in response to detection of said markings to actuate the switches which correspond to the different record numbers represented by said markings to provide values of said resultant voltages proportional to said resultant numbers, and translating means connected to said circuit means for energization in accordance with said resultant voltages to produce a response which is a function of the ratio of said resultant voltages.

8. In a reproducing device responsive to a pair of record devices having respectively first and second markings imposed thereon, said first markings being arranged to represent different record numbers providing a resultant number corresponding to the value of the real power component measured in an electrical circuit, said second markings being arranged to represent different record numbers providing a resultant number corresponding to the value of the reactive power component measured in said circuit, scanning means operable to scan said record devices simultaneously for detecting said markings, a source of alternating voltage, a transformer device including a primary winding connected for energization from said voltage source, and a separate secondary winding section for each of said different record numbers; each of said winding sections producing a separate voltage quantity in response to energization of said primary winding, said separate voltage quantities providing a pair of resultant voltages each representing a separate one of said power components, said winding sections being selected such that said separate voltage quantities have values proportional to said different record numbers, circuit means connecting said winding sections in series relation, a plurality of actuable switches each arranged to control the connection of a separate one of said winding sections to said circuit means to thereby control the values of said resultant voltages, said scanning means operating in response to detection of said markings to actuate the switches which correspond to the different record numbers represented by said markings to provide values of said resultant voltages proportional to said resultant numbers, and translating means connected to said circuit means for energization in accordance with said resultant voltages to produce a response which is a function of the ratio of said resultant voltages.

9. In a reproducing device responsive to a pair of record devices having respectively first and second markings imposed thereon, said first markings being arranged to represent different first record numbers providing a resultant number corresponding to the value of the real power component measured in an electrical circuit, said second markings being arranged to represent different record numbers providing a resultant number corresponding to the value of the reactive power component measured in said circuit, scanning means operable to scan said record devices simultaneously for detecting said markings, a separate electrical circuit component for each of said different record numbers, a source of electrical voltage, each of said circuit components being arranged for energization from said source of voltage to produce a separate voltage quantity, said separate voltage quantities providing a pair of resultant voltages each representing a separate one of said power components, said circuit components being selected such that said separate voltage quantities have values proportional to said different record numbers, circuit means connecting said circuit components in series relation, a plurality of actuable switches each arranged to control the connection of a separate one of said circuit components to said circuit means to thereby control the values of said resultant voltages, said scanning means operating in response to detection of said markings to actuate the switches which correspond to the different record numbers represented by said markings to provide values of said resultant voltages proportional to said resultant numbers, and an electrical ratio instrument including a pair of crossed coils, each of said coils being connected to said circuit means for energization in accordance with a separate one of said resultant voltages to produce a response which is a function of the phase angle under which the power values were measured.

10. In a reproducing device responsive to a pair of record devices having respectively first and second markings imposed thereon, said first markings being arranged to represent different record numbers providing a resultant number corresponding to the value of the real power component measured in an electrical circuit, said second markings being arranged to represent different record numbers providing a resultant number corresponding to the value of the reactive power component measured in said circuit, scanning means operable to scan said record devices simultaneously for detecting said markings, a source of alternating voltage, a transformer device including a primary winding connected for energization from said voltage source, and a separate secondary winding section for each of said different record numbers; each of said winding sections producing a separate voltage quantity in response to energization of said primary winding, said separate voltage quantities providing a pair of resultant voltages each representing a separate one of said power components, said winding sections being selected such that said separate voltage quantities have values proportional to said different record numbers, circuit means connecting said winding sections in series relation, a plurality of actuable switches each arranged to control the connection of a separate one of said winding sections to said circuit means to thereby control the values of said resultant voltages, said scanning means operating in response to detection of said markings to actuate the switches which correspond to the different record numbers represented by said markings to provide values of said resultant voltages proportional to said resultant numbers, and an electrical ratio instrument including a pair of crossed coils, each of said coils being connected to said circuit means for energization in accordance with a separate one of said resultant voltages to produce a response which is a function of the phase angle under which the power values were measured.

References Cited in the file of this patent

UNITED STATES PATENTS

| | | |
|---|---|---|
| 1,637,852 | Brandenburg | Aug. 2, 1927 |
| 2,248,504 | Kenny | July 8, 1941 |
| 2,452,587 | McCoy | Nov. 2, 1948 |
| 2,463,534 | Hawkins | Mar. 8, 1949 |
| 2,514,054 | Hallden | July 4, 1950 |
| 2,557,954 | Durheim et al. | June 26, 1951 |
| 2,573,405 | Clark | Oct. 30, 1951 |
| 2,610,102 | Gitzendanner | Sept. 9, 1952 |
| 2,660,372 | LeClerc | Nov. 24, 1953 |
| 2,800,280 | Haynes et al. | July 23, 1957 |